United States Patent [19]

Grunberg

[11] Patent Number: 4,712,658
[45] Date of Patent: Dec. 15, 1987

[54] METHOD OF AUTOMATICALLY OPERATING A CLUTCH RELEASE BEARING ACCORDING TO THE SPEEDS OF THE SHAFTS COUPLED BY AN ASSOCIATED CLUTCH

[75] Inventor: Pierre Grunberg, Paris, France
[73] Assignee: Valeo, Paris, France
[21] Appl. No.: 854,833
[22] Filed: Apr. 23, 1986
[30] Foreign Application Priority Data Apr. 24, 1985 [FR] France ................... 85 06221

[51] Int. Cl.4 ............................................. F16D 43/04
[52] U.S. Cl. ................................. 192/0.033; 192/52; 192/103 R
[58] Field of Search ............ 192/0.033, 103 R, 103 C, 192/103 F, 52, 109 F, 0.076

[56] References Cited

U.S. PATENT DOCUMENTS

| 3,752,284 | 8/1973 | Brittain et al. ............ 192/103 C X |
| 4,019,614 | 4/1977 | Prenzel et al. ............ 192/103 F |
| 4,061,217 | 12/1977 | Toyota et al. ............ 192/0.076 X |
| 4,086,992 | 5/1978 | Hamada et al. ............ 192/0.076 |
| 4,086,994 | 5/1978 | Hirosawa et al. ............ 192/109 F |
| 4,172,505 | 10/1979 | Rabus et al. ............ 192/52 X |
| 4,295,551 | 10/1981 | Zimmermann et al. ........ 192/0.076 |
| 4,343,387 | 8/1982 | Hofbauer ............ 192/0.076 |
| 4,401,200 | 8/1983 | Heidemeyer et al. ...... 192/103 F X |

FOREIGN PATENT DOCUMENTS

| 0043661 | 1/1982 | European Pat. Off. . |
| 0057322 | 8/1982 | European Pat. Off. . |
| 0130792 | 1/1985 | European Pat. Off. . |
| 2626352 | 1/1977 | Fed. Rep. of Germany . |
| 2292895 | 6/1976 | France . |
| 2525163 | 10/1983 | France . |
| 2080910 | 2/1982 | United Kingdom . |
| 2104983 | 3/1983 | United Kingdom ............ 192/109 F |

Primary Examiner—Rodney H. Bonck
Attorney, Agent, or Firm—Charles E. Brown; Charles A. Brown

[57] ABSTRACT

In a method of automatically operating a clutch release bearing to re-engage a friction clutch adapted to transmit between first and second shafts a torque conditioned by the action of the release bearing on a clutch release device associated with the clutch, the clutch release bearing has a predetermined total travel. This extends between a clutch released position in which no torque is transmitted between the shafts and a clutch engaged position in which the shafts are coupled together in rotation. The clutch release bearing is moved according to speed modes selected from a plurality of predetermined speed modes according to the rotation speeds of the first and second shafts or the gear ratio. During a first phase the clutch release bearing is moved in accordance with a first or fast speed modes over at least a predetermined approach travel. Beyond this the changing difference between the rotation speeds of the two shafts is monitored. When a decrease in this difference is detected, a second or slow speed mode is substituted for the first speed mode.

11 Claims, 5 Drawing Figures

METHOD OF AUTOMATICALLY OPERATING A CLUTCH RELEASE BEARING ACCORDING TO THE SPEEDS OF THE SHAFTS COUPLED BY AN ASSOCIATED CLUTCH

BACKGROUND OF THE INVENTION

1. Field of the Invention

The invention concerns re-engaging an automatically controlled friction clutch, in particular for an automobile vehicle equipped with an automatic or semi-automatic transmission.

2. Description of the Prior Art

The invention is more precisely concerned with a method of automatically operating a clutch release bearing during the re-engagement phase following a change in gear ratio, the clutch release bearing operating on a clutch release member of the clutch in question, in accordance with predetermined laws of displacement speed conditioned by the rotation speeds of two shafts coupled in rotation by the clutch.

As is well known, a friction clutch is a device for transmitting frictionally, between a first shaft and a second shaft coaxial with the first, a torque which is modulated according to the operation of an associated clutch release bearing on a clutch release member of the clutch. The clutch release bearing has a predetermined total travel between a clutch released position in which no torque is transmitted between the shafts and a clutch engaged position in which the shafts are coupled together in rotation. This total travel generally comprises a dead travel between the clutch released position and an intermediate position, sometimes called the take-up position (in which torque begins to be transmitted from one of the shafts to the other), a usable travel corresponding to increasingly complete transmission of torque up to a complete coupling position, and a final travel to the clutch engaged position which serves to consolidate the rotational coupling of the shafts.

In more precise terms, a friction clutch of this kind comprises a group of at least two transverse plates rotationally coupled to the first shaft but free to move closer together or further apart, at least one friction disk fastened to the second shaft disposed between the plates, and the aforementioned clutch release member, such as a diaphragm, normally urging the plates towards each other so as to frictionally lock together the plates and the friction disk, but which can release its pressure continuously in response to the action of the clutch release bearing, so as to permit progressive decoupling of the two shafts. This decoupling is accompanied by circumferential slipping between the plates and friction disk, which is why the term slip travel or area is sometimes used for the travel of the clutch release bearing between its take-up position and its complete coupling or even its clutch engaged position.

In an automatic clutch control system the problem arises of defining the displacement of the clutch release bearing between its extreme positions. A clutch of this kind is generally associated with a gearbox and it is necessary to implement automatically transient conditions that are as smooth and flexible as possible on changing the gearbox ratio.

The invention is more specifically concerned with engaging a new ratio within a gearbox, that is to say, in more general terms, with coupling together again two shafts rotating at sufficient and non-zero speeds.

One such determination of the conditions for re-engaging a clutch between two shafts rotating at non-zero speeds is proposed, for example, in French Pat. No. 2 525 163 (patent application Ser. No. 83 06708 dated Apr. 19, 1983); this document teaches that, on changing gear ratio, the clutch release bearing is displaced over its slip travel (up to its clutch engaged position, nothing being mentioned with regard to the approach travel from the clutch released position) at a speed directly proportional to the degree to which the motor speed is greater than the speed of the gearbox input shaft and, preferably, the transmission ratio selected in the gearbox. This document therefore teaches the provision of a number of programs covering the slip travel of which one is selected for the re-engagement phase according to the relative rotation speeds of the shafts.

However, it has been found that this solution is not fully satisfactory from the point of view of the smoothness and flexibility of driver control in the case of an automobile vehicle, and in that it has been found necessary to carry out experimental tests in order to define the speed programs to be implemented for each individual application.

An object of the invention is to provide for increased flexibility of operation and simplified determination of the speed programs to be used.

SUMMARY OF THE INVENTION

The present invention consists in a method of automatically operating a clutch release bearing in order to re-engage a friction clutch adapted to transmit between first and second rotating shafts a torque conditioned by the action of said release bearing on a clutch release device associated with the clutch, said clutch release bearing having a predetermined total travel between a clutch released position in which no torque is transmitted between said shafts and a clutch engaged position in which said shafts are coupled together in rotation, in which method the clutch release bearing is moved according to speed modes selected from a plurality of predetermined speed modes according to the rotation speeds of the first and second shafts or the gear ratio, the clutch release bearing being moved during a first phase in accordance with a first or fast speed mode over at least a predetermined approach travel beyond which the changing difference between the rotation speeds of the two shafts is monitored and, when a decrease in this difference is detected, a second or slow speed mode is substituted for said first law.

The invention therefore proposes the use of only two speed modes and to combine them at the time of re-engagement not according to the relative value at a given time of the rotation speeds of the two shafts but according to whether these speeds are converging or diverging.

In an advantageous embodiment of the invention, once these speeds have converged, a fast regime is reselected as soon as the speeds have become sufficiently similar. This amounts to combining the speed laws only for the slip travel in the strict sense of the term and to covering at high speed the dead travels on either side of this useful travel.

In a preferred embodiment of the invention, for reasons of simplicity, the speed modes governing engagement of the clutch release bearing correspond to one or more phases. The fast speed mode preferably corresponds to a single phase, as does the slow speed mode:

in this case the clutch release bearing is moved at one or the other (fast or slow) of two predetermined speeds.

The objects, characteristics and advantages of the invention will emerge from the following description given by way of non-limiting example only with reference to the accompanying drawings.

DESCRIPTION OF THE PREFERRED EMBODIMENTS

Figure 1:
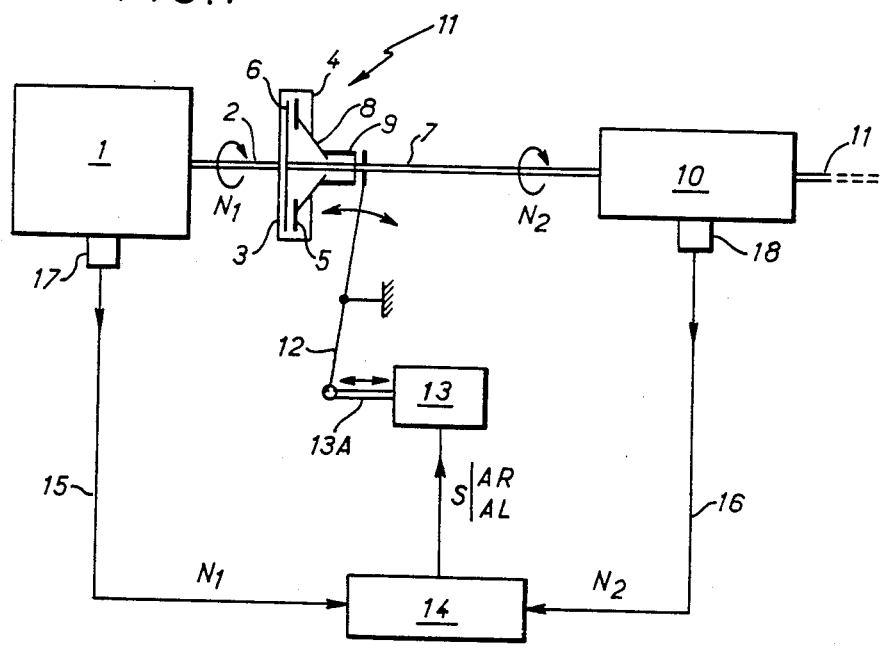
FIG. 1 is block diagram of a torque transmission system suitable for implementing the invention for operating a clutch release bearing.

FIG. 1 is a schematic representation of a motor 1 having an output shaft 2 rotating at a speed $N_1$. This shaft (crankshaft) carries at its end a reaction plate 3 to which is rotationally coupled, through the intermediary of a cover 4, a pressure plate 5 adapted to move away from or towards the reaction plate 3. Between the plates 3 and 5 there is disposed a friction disk 6 fixed to a second shaft 7 coaxial with the shaft 2. Inside the cover 4 there is a clutch release member 8, such as an elastic diaphragm, which normally urges the pressure plate 5 towards the reaction plate 3 so as to clamp up the friction disk and drive it into rotation by friction, but which can release its pressure when acted on by a clutch release bearing 9. The second shaft 7 leads into a gearbox 10 of which it constitutes a primary shaft and which has an output shaft 11.

The plates 3 and 5, the friction disk 6, the clutch release member 8 and the cover 4 form an assembly 11 called a clutch.

The clutch release bearing 9 is adapted to move along the shaft 7, which it encircles, over a predetermined total travel L (see FIGS. 4 and 5), between a clutch released position in which no torque is transmitted between the shafts 2 and 7 (the plates 3 and 5 are moved apart) and a clutch engaged position in which the shafts are coupled together in rotation (the clutch release member returns to its normal configuration and the friction disk 6 is clamped between the plates 3 and 5).

The displacement of the clutch release bearing 9 is controled by an operating member 12, such as a clutch release yoke, the position of which is in turn controlled by a control member 13 such as a servo or actuator.

The actuator 13 comprises a body from which a rod 13A projects to a degree conditioned by a signal S produced by a processing and control unit 14. At this unit terminate lines 15 and 16 over which arrive respective signals representing the rotation speeds $N_1$ and $N_2$ of the shafts 2 and 7 from speed sensors 17 and 18, of any appropriate known type, respectively associated with the motor 1 and the gearbox 10.

Figure 2:
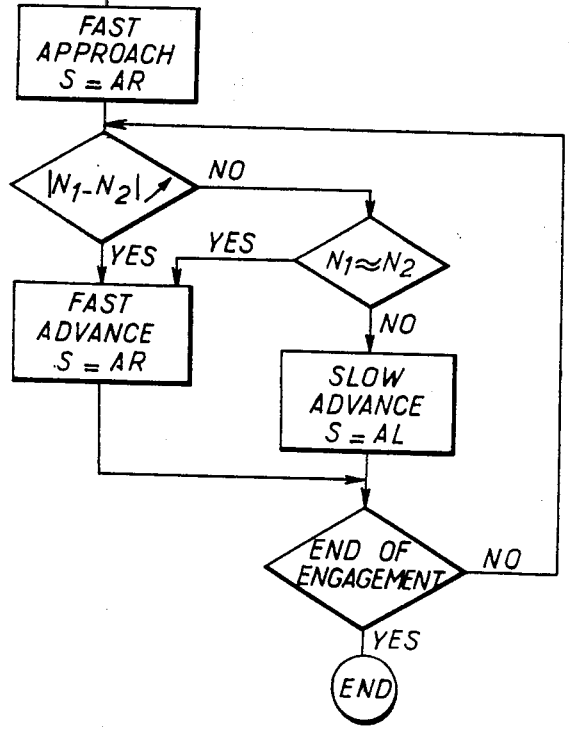
FIG. 2 is a basic flowchart of the method of operating the clutch release bearing in accordance with the invention.

FIG. 2 is a flowchart showing how the control signal S is defined in terms of $N_1$ and $N_2$.

The invention makes use of two speed modes, one of which is applied to the clutch release bearing according to whether at a given time the speeds $N_1$ and $N_2$ are tending to move closer together (converge) or further apart (diverge). Thus the invention proposes to use a first or fast speed mode AR for moving the clutch release bearing from its clutch released position over at least a predetermined approach travel beyond which the changing difference between the rotation speeds $N_1$ and $N_2$ is monitored in absolute terms ($|N_1 - N_2|$); when a decrease in this difference is detected, a slow speed mode AL is used.

The approach travel is preferably delimited by the clutch released position of the clutch release bearing and an intermediate position in which the clutch transmits to the shaft 7 a predetermined proportion (20%, for example) of the torque that can be transmitted to the shaft 7. This intermediate position is thus in practice different from the take-up position mentioned above.

Given that this approach travel is traversed according to a single predetermined speed mode, it corresponds to a minimum duration during which the fast speed mode AR is chosen.

It goes without saying that the values of $N_1$ and $N_2$ are monitored continuously but that they need to be taken account of only beyond this approach travel.

According to a preferred implementation of the invention, in order for the slow speed mode AL to be applied only when this is really necessary, that is to say with a view to combining flexibility, comfort and rapidity at the end of re-engagement, the fast speed mode is substituted for the slow speed mode as soon as the speeds $N_1$ and $N_2$ have become approximately equal. This may be characterized by the fact that the difference $|N_1 - N_2|$ falls below a predetermined threshold which is preferably of the proportional type, meaning that it represents a fraction such as approximately 5% of $N_2$ (or $N_1$). As an alternative, it may be a fixed difference.

The choice of how to implement the basic flowchart of FIG. 2 is within the competence of those skilled in the art. Primarily, a choice may be made between logic circuits or an appropriate type of microprocessor or microcomputer. The programming of any such microprocessor is likewise within the competence of those skilled in the art.

Figure 3:
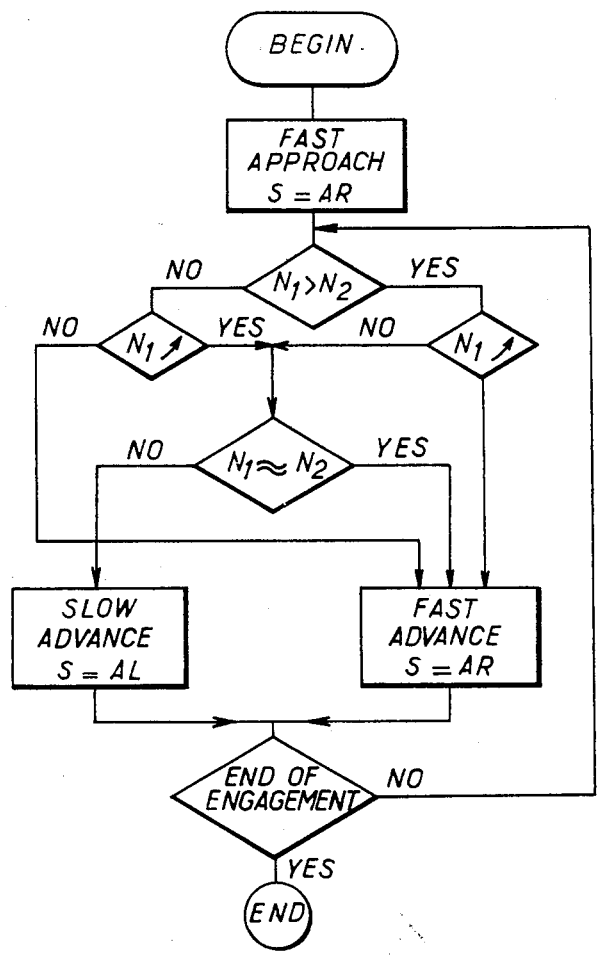
FIG. 3 is a flow chart of a preferred version of the method.

FIG. 3 shows a variation on the flowchart of FIG. 2 that is easier to implement.

Following the approach phase, this method compares the instantaneous values of the speeds $N_1$ and $N_2$ and monitors the direction in which the speed $N_1$ of the motor 1 is varying. The result of these two tests is used to decide which speed mode to follow, speed mode AR or AL. It is a simple matter to verify that the FIG. 3 flowchart, given that the variations in $N_2$ are necessarily slower than the variations in $N_1$ because of the inertia of the masses involved, yields results comparable with that of FIG. 2. For example, when $N_1$ is greater that $N_2$ an increase in $N_1$ increases the difference and, conversely, when $N_1$ is less than $N_2$, a decrease in $N_1$ increases the difference. Thus monitoring of the absolute value of the difference $N_1 - N_2$ between the rotation speeds of the two shafts has been replaced by the simple use of the sign of the difference $N_1 - N_2$ and then the sign of the variation (acceleration or deceleration) of the speed $N_1$ alone.

Figure 4:
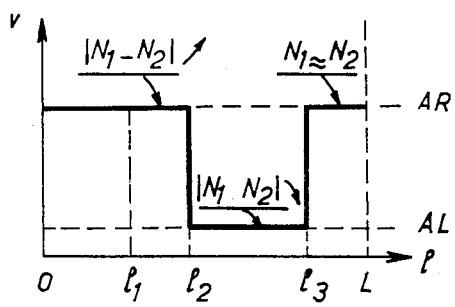
FIG. 4 is a speed/operating travel diagram for re-engagement of the clutch release bearing in a preferred version of the invention.
Figure 5:
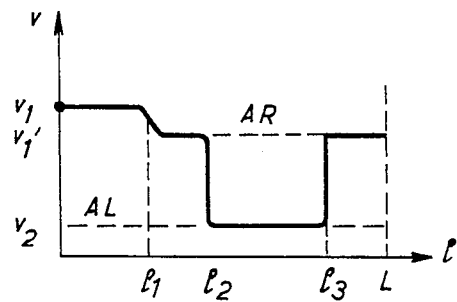
FIG. 5 is a variation on FIG. 4.

FIGS. 4 and 5 show sample speed modes AR and AL and how they are used. These diagrams show the changing displacement speed $\underline{v}$ of the clutch release bearing as a function of the instantaneous position of the clutch release bearing between its extreme positions.

In accordance with a first version of the invention the speed modes AR and AL each correspond to a single speed value: this provides for great simplicity of implementation since S has only two possible levels corresponding to two speeds of displacement of the rod 13A of the actuator. Thus in FIG. 4 $\underline{v}$ remains at a high level until $N_1$ and $N_2$ begin to converge ($l_2$) beyond the approach travel $l_1$, goes to a low level until $N_1$ and $N_2$ become sufficiently close, and then returns to the high level.

In practice the changes between the speed levels are gradual.

In the more sophisticated version shown by way of example in FIG. 5 the fast speed mode AR covers a number of phases corresponding to an average speed $v_1$ for the approach travel ($0-l_1$) and a lower speed $\overline{v'}_1$, which nevertheless remains higher than the slow speed of AL, up to $l_2$. The phase ($l_2-l_3$) corresponds to the slow speed mode AL and then the fast speed mode AR is adopted for ($l_3-L$). In another, more sophisticated version (not shown) the invention lends itself to any desirable modulation of the speed modes AR and AL as a function of certain parameters such as the motor speed, the gearbox ratio, and the position of the accelerator pedal.

By way of example, in the case of FIG. 4 the constant speed associated with the law AR corresponds, for the release bearing, to a time of 0.25 s to travel between its extreme positions whereas the constant speed associated with the law AL corresponds to a time of 1.25 s, in other words five times as long. In practice, the ratio of these speeds is generally chosen between 3 and 10.

It is obvious that the preceding description has been given by way of illustrative example only and that numerous variants may be put forward by those skilled in the art, just as much with regard to the trend of the laws AR and AL as with regard to the specific means to be implemented to select these speed modes according to the values of $N_1$ and $N_2$.

There is claimed:

1. Method of automatically operating a clutch release bearing in order to re-engage a friction clutch adapted to transmit between first and second rotating shafts a torque depending on the action of said release bearing on a clutch release device associated with the clutch, said clutch release bearing having a predetermined total travel between a clutch released position in which no torque is transmitted between said shafts and a clutch engaged position in which said shafts are coupled together in rotation, in which method the clutch release bearing is moved according to speed modes selected from a plurality of predetermined modes related to the rotation speeds of the first and second shafts, the clutch release bearing being moved during a first phase in accordance with a first or fast speed mode over at least a predetermined approach travel beyond which the changing difference between the rotation speeds of the two shafts is monitored and, when a decrease in this difference is detected, a second or slow speed mode is substituted for said first speed mode.

2. Method according to claim 1, wherein said predetermined approach travel corresponds to displacement of the clutch release bearing between its clutch released position and an intermediate position corresponding to approximately 20% of the torque transmission capacity of the clutch.

3. Method according to claim 1, wherein the first speed mode is substituted for the second speed mode as soon as the absolute difference between the rotation speeds of said shafts falls below a predetermined threshold.

4. Method according to claim 3, wherein said threshold is a proportional threshold corresponding to approximately 5% of the speed of the second shaft.

5. Method according to claim 1, wherein said first speed mode varied as a function of the position of the clutch release bearing comprises separate sections each corresponding to a constant speed.

6. Method according to claim 5, wherein said first speed mode is linear, comprising only one phase.

7. Method according to claim 1, wherein said second speed mode is linear.

8. Method according to claim 1, wherein the second speed law is approximately 3 to 10 times slower than the first speed mode.

9. Method according to claim 1, wherein the second speed mode is approximately five times slower than the first speed mode.

10. Method according to claim 1, wherein the changing difference between the rotation speeds of the two shafts is monitored on the basis of the direction in which the absolute value of the difference between said speeds varies.

11. Method according to claim 1, wherein the changing difference between the rotation speeds of the two shafts is monitored on the basis of the sign of the difference between said speeds and the direction in which one speed varies.

* * * * *